Jan. 30, 1951   F. E. RUNGE   2,539,636
ROTARY VALVE
Filed Aug. 31, 1945   2 Sheets-Sheet 1

INVENTOR
FRANK E. RUNGE
BY
ATTORNEY

Jan. 30, 1951

F. E. RUNGE 2,539,636

ROTARY VALVE

Filed Aug. 31, 1945

2 Sheets-Sheet 2

INVENTOR
FRANK E. RUNGE

BY

ATTORNEY

Patented Jan. 30, 1951

2,539,636

UNITED STATES PATENT OFFICE 2,539,636

ROTARY VALVE

Frank E. Runge, Branford, Conn., assignor to Radio Corporation of America, a corporation of Delaware Application August 31, 1945, Serial No. 613,773

5 Claims. (Cl. 251—93)

This invention relates to improvements in rotary or rocking type valves for use in high vacuum plumbing systems.

In the usual rotary type vacuum valve the plug or rotor and the valve body or bearing are in the form of complementary cones, ground and lapped to ensure a good fit, and are thrust into engagement either manually or by means of a compression spring. Such valves may jam and, in any event, are difficult to turn. If loosened to permit easy turning they may leak. In some applications slight leakage may be of no great importance but in high vacuum systems no leakage at all can be tolerated. The use of "stop-cock grease" may render the valve vacuum tight, temporarily, but such lubricants tend to pump-out and to leave a cementitious residue which renders the valve difficult to operate.

Accordingly, the principal object of this invention is to obviate the foregoing and other less apparent objections to present day rotary type valves.

Another and specific object of the present invention is to provide an improved vacuum tight rotary type valve and lubricating system therefor and one which dispenses with the close tolerances, biasing springs and odd-shape rotors of the prior art.

The foregoing and other objects are achieved in accordance with the invention by the provision, between the rotor and its bearing, of a bushing constituted of a rubber like substance which swells, to a limited extent, and exhibits the wetting properties of a wick when exposed to a low-vapor pressure fluid lubricant and by the provision of a novel lubricating system for said bushing. The elastic bushing soaks up and retains the lubricant and acts like an "oilite" (i. e. powdered-metal) bushing in feeding oil through itself in the manner of a wick. The bushing material swells to a limited extent, when exposed to the oil, and completely fills the clearance space between the rotor and its seat. There is thus no necessity for using any thrusting force in turning the valve and the rotor may be therefor made in the form of a cylindrical plug (instead of in the form of a truncated cone) without danger of leakage.

Figure 1:
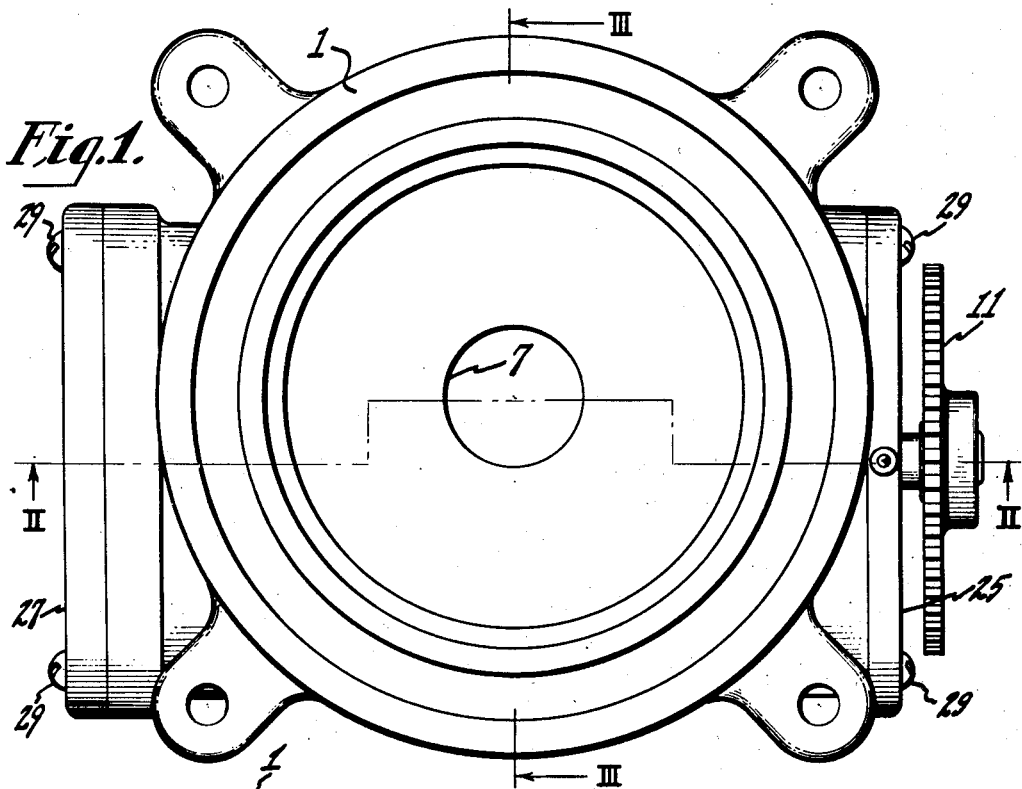
Figure 2:
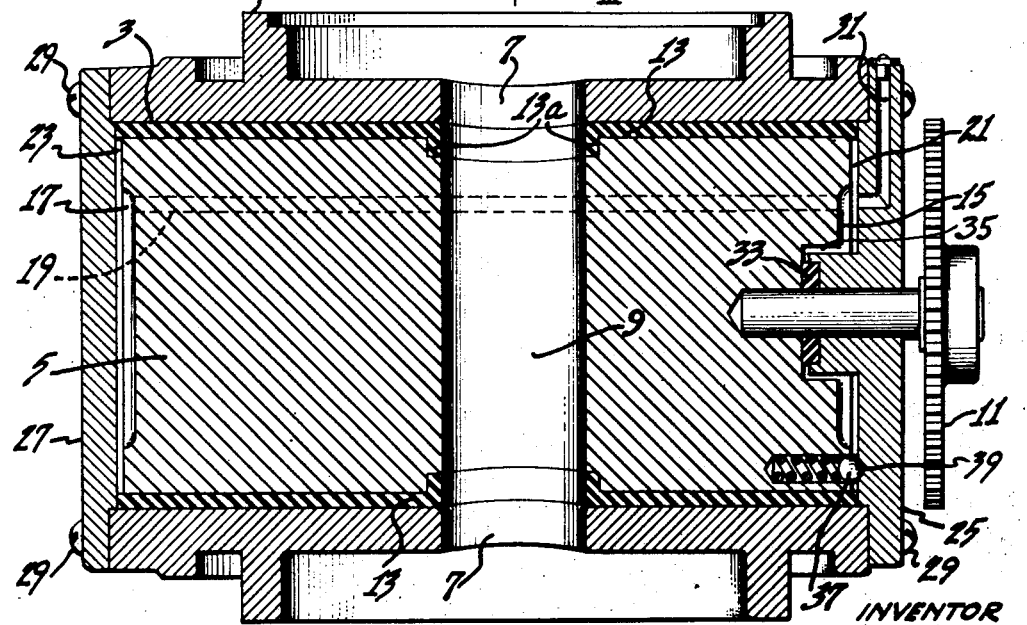
Figure 3:
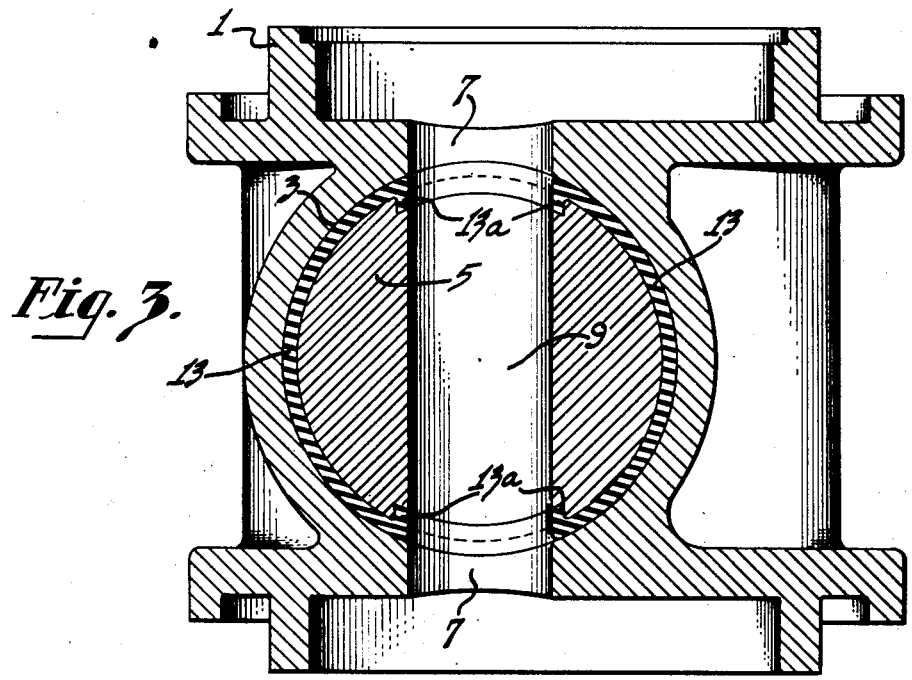
Figure 4:
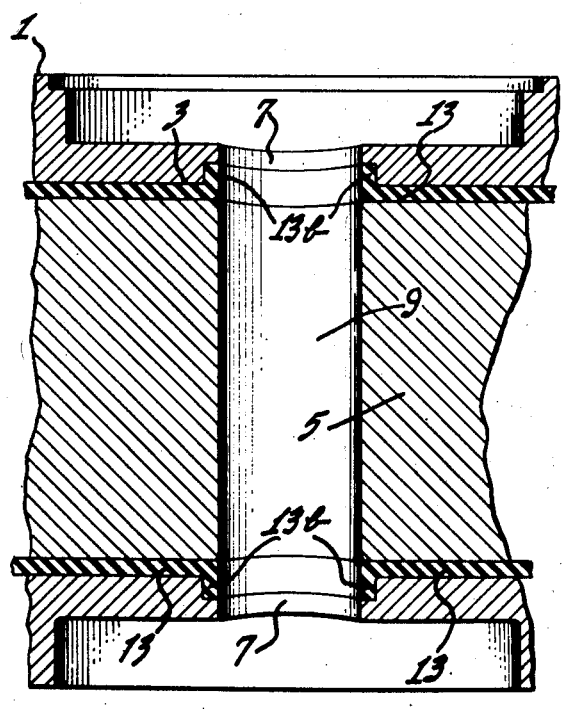

Certain preferred details of construction together with other objects and advantages of the invention will be apparent upon reference to the following specification and to the accompanying drawings, wherein Fig. 1 is a top plan view, Fig. 2 is a sectional view taken on the line II—II of Fig. 1 and Fig. 3 is a sectional view taken on the line III—III of Fig. 1, of a rotary valve constructed in accordance with the invention and Fig. 4 is a vertical fragmentary sectional view of an alternative embodiment of a valve within the invention.

In the accompanying drawings wherein like reference characters designate the same or corresponding parts in all figures, 1 designates a valve body or casing which may comprise a metal casting having a smooth horizontal bore 3 in which a rotatable cock or plug 5 is seated, and a vertical bore 7 which intersects the horizontal bore 3. The vertical bore 7 communicates with one or more flow-openings 9 in the rotatable member when the said rotor plug is turned, as by means of a gear or handle 11, to that angular position whereat the selected flow opening is in register with said vertical bore. The plug or rotatable member 5 preferably comprises a metal cylinder of a uniform diameter substantially smaller (e. g. one-eighth of an inch smaller) than that of the diameter of the bore 3 within which it is seated.

The difference in the diameters of the rotatable plug 5 and its seat 3 provides a clearance space for a bushing or gasket 13. As previously indicated the bushing 13 is constituted, in accordance with the invention of a yieldable rubber-like substance which swells, at least to a limited extent, when exposed to a suitable liquid lubricant. Among the rubber-like substances which may be employed as the gasket material are polychloroprene ("Neoprene"), organic polysulfide ("Thiokol") and butadiene, acrylonitrile copolymer ("Buna N"). Where the valve of the invention is called upon to sustain a very high vacuum the lubricating oil for the bushing must be of the type which exhibits a low-vapor pressure. "Octoil" exhibits this characteristic and, further, is recommended because it is non-fouling. In some installations other oils, including the common hydrocarbon oils, may be used. In this case it should be borne in mind that the aniline point of a hydrocarbon measures the tendency of the synthetic rubbers to swell, i. e. the higher the aniline point the less effect the oil has on the rubber. When the apparatus of the invention is designed to operate at room temperatures the bushing material may be caused to swell 100 percent without impairing its usefulness.

The "Octoil" or other lubricating oil is supplied to the bushing 13 from a reservoir 15 at the front end, and through a well 17 at the rear end, of the rotor 5. These oil chambers 15 and 17 are interconnected by a small bore 19 which extends through the rotor, and there are two radially extending channels or grooves 21 and 23, one at each end of the rotor, which communicate with the bushing. The bushing 13 is thus supplied continuously, either by gravity or by capillary attraction, with the lubricant, which as previously set forth, causes the rubber to swell and to completely fill the space between the rotor 5 and the inner surface 3 of the valve body 1.

In the embodiment of the invention shown in Figs. 2 and 3, the synthetic rubber bushing 13 is cemented or otherwise permanently affixed to the rotatable plug 5, whereas in the alternative embodiment of the invention shown in Fig. 4 the bushing material is bonded to the inner surface of the bore 3 in which the plug is seated. In both cases the uncovered valve surface 3 or 5 is preferably lapped and polished to ensure easy turning. In the first case (see Fig. 2) the bushing material may extend into the flow opening 9 in the plug, as indicated at 13a and in the other case (see Fig. 4) it may extend into the vertical bore of the valve body or casting 1, as shown at 13b. The fact that some of the lubricant may thus be drawn to the said openings is of no moment when the lubricant comprises a low vapor pressure oil. In the event the valve is incorporated in an electron-microscope (see Zworykin et al. 2,284,710) or similar device, wherein it is desirable to avoid even the possibility of contaminating the specimen, the specimen chamber should be located above, and the vacuum pump below, the valve.

Referring to Fig. 2, particularly: The rotatable plug 5 is held within its seat 3 by front and rear face plates 25 and 27 respectively, which are secured to the body or casting 1 as by screws 29.

The front plate 25 is provided with a vertically extending channel or hole 31 for filling the reservoir 15 with oil. The gear shaft or handle 11 for the plug 5 extends through the front plate and through a felt or synthetic rubber bushing 33 which may be supplied with lubricating oil from the reservoir 15 through a channel 35. The rotor 5 may be provided with a "click," comprising a spring biased ball bearing 37 and a indent 39 for indicating to the operator, through his sense of touch, that the flow opening 9 is in register with the vertical bore 7 of the valve block.

It will now be apparent in view of the foregoing description, that the present invention provides a simple, inexpensive and trouble-free vacuum-tight rotary valve and lubricating system therefor.

What is claimed is:

1. A rotary valve comprising a casing provided with flow openings and internal seating surfaces, a valve plug also provided with seating surfaces rotatably mounted within said casing and having a bore extending therethrough adapted to register in one of its rotary positions with the flow openings in said casing, an elastic bushing constituted of synthetic rubber permanently affixed to and substantially covering at least one of said surfaces, and means supplying a lubricant to said bushing of a character which effects swelling of said rubber without destroying it.

2. The invention as set forth in claim 1 and wherein said lubricating means for said bushing comprises a reservoir within said rotatable plug.

3. The invention as set forth in claim 1 and wherein said rotatable plug comprises a cylindrical member of substantially uniform diameter throughout its length.

4. The invention as set forth in claim 1 and wherein said elastic bushing is bonded to said rotatable plug.

5. The invention as set forth in claim 1 and wherein said elastic bushing is bonded to said bearing.

FRANK E. RUNGE.

REFERENCES CITED

The following references are of record in the file of this patent:

UNITED STATES PATENTS

| Number | Name | Date |
| --- | --- | --- |
| 1,739,787 | Doughty | Dec. 17, 1929 |
| 2,145,628 | Milliken | Jan. 31, 1939 |
| 2,210,046 | Schubring | Aug. 6, 1940 |
| 2,285,222 | Mueller | June 2, 1942 |
| 2,394,364 | Christensen | Feb. 5, 1946 |
| 2,424,567 | Hill | July 29, 1947 |

FOREIGN PATENTS

| Number | Country | Date |
| --- | --- | --- |
| 49,086 | Germany | Apr. 4, 1889 |